United States Patent [19]

Dickey

[11] 3,896,037

[45] July 22, 1975

[54] HIGH BASIC SULFONATE PROCESS

[75] Inventor: Charles R. Dickey, Covina, Calif.

[73] Assignee: Bray Oil Company, Los Angeles, Calif.

[22] Filed: Dec. 27, 1971

[21] Appl. No.: 212,661

[52] U.S. Cl. .................... 252/33.4; 252/18; 252/33
[51] Int. Cl.² .......................................... C10M 1/40
[58] Field of Search.................... 252/18, 33, 33.4

[56] References Cited
UNITED STATES PATENTS

| | | | |
|---|---|---|---|
| 2,920,105 | 1/1960 | Kluge et al. | 252/33.4 X |
| 3,170,880 | 2/1965 | Vorhees | 252/33 X |
| 3,262,880 | 7/1966 | Vorhees | 252/33 |

Primary Examiner—Delbert E. Gantz
Assistant Examiner—Andrew H. Metz
Attorney, Agent, or Firm—Vanderveer Voorhees; Thomas Schenach

[57] ABSTRACT

Overbased oil soluble sulfonates of metals of Group 2 with alkali values of 250 to 500 are made from a mixture of the sulfonate, oil, methanol, hydrocarbon solvent and $CO_2$- methanol overbasing metal complex by evaporating methanol to a point short of gel formation, treating with a critical amount of water equal to about 1 to 2 mols per atom of overbasing metal, evaporating un-combined methanol and treating again with an excess of water to complete the hydration.

5 Claims, No Drawings

HIGH BASIC SULFONATE PROCESS

This invention relates to the manufacture of oil soluble sulfonates of Group 2 metals, particularly magnesium and calcium. Sulfonates are of the "mahogany" type having 20 to 40 carbon atoms. More particularly, it relates to the so-called "over based" sulfonates characterized by an alkali value (A.V.) of upwards of 250 mg. KOH per gram and ranging from 250 to 500 A.V. Heretofore, hibased calcium sulfonates have been made by reacting neutral calcium sulfonate-oil solutions with calcium oxide and carbon dioxide ($CO_2$) in presence of anhydrous methanol, distilling off the methanol and treating with water in presence of a hydrocarbon solvent to invert the gel resulting from methanol removal. See U.S. Pat. Nos. 3,318,809; 3,105,049; 3,155,616; 3,155,617; 3,170,880. For barium sulfonates, barium oxide is used; with magnesium sulfonates, the overbasing is done with magnesium methylate made by dissolving the metal in methanol.

Sulfonate for this process can be made by sulfonating with $SO_3$ or oleum, a lubricating oil distillate such as 480 neutral oil which has been acid treated or solvent extracted to remove condensed ring aromatics. Or it can be made by sulfonating alkyl benzene of upwards of 350 molecular weight - usually 350 to 600 mol. wt. Dialkyl benzenes are desirable, as described in U.S. Pat. No. 3,173,965. Benzene alkylated with alpha olefines or monochlor paraffins, preferably straight chain paraffins, is desirable. A convenient alkylate results when benzene is alkylated with monochlor paraffins of normal structure separated from petroleum distillate by the use of molecular sieves which reject the branched chain hydrocarbons. Normal hydrocarbon fractions containing about 10 to 13 carbon atoms, chlorinated and reacted with excess benzene in presence of aluminum chloride catalyst, give an alkylate from which a light fraction can be sulfonated to produce water soluble household detergent and a heavy fraction or residue boiling in the range of about 690° - 760°F, suitable for sulfonation to oil soluble sulfonates.

These oil soluble sulfonates are especially desirably as additives for lubricating oils, where they serve to prevent accumulations of sludge in bearings, piston rings, valves, etc. The high alkali value or "reserve alkalinity" neutralizes acids forming in the oil as a result of oxidation or contamination.

Objects of the invention herein are desirable produce sulfonates of high alkali reserve which are bright and clear and of low viscosity without encountering difficulty in filtration.

In the process of making overbased oils by the use of methanol and calcium oxide, much care must be used to prevent the calcium carbonate formed as a colloidal gel in the reaction from crystallizing or aggregating to particles in the range of about 0.1 to 10 microns which render the oil hazy or cloudy. Aggregation is normally prevented by the peptizing action of the sulfonate which surrounds the particles of carbonate with a protective film of oil, preventing crystal growth. However, in the presence of water and methanol, rapid crystal growth ensues, producing oils which are impossible to filter. The greater the concentration of carbonate, the more critical this becomes, so that it is difficult to make oils with alkali values above 300. When sufficient calcium oxide and $CO_2$ are used to give an oil of 350 – 400 A.V. and the methanol is evaporated from the reaction mixture, gelling usually results at a temperature of about 180° – 225°F, making it nearly impossible to remove all the methanol by further heating. Consequently, if water is added at this stage, the oil is degraded to an unfilterable material and often to a product resembling mustard.

I have now discovered that the filtration difficulties can be avoided by initially treating the carbonated methanol and oxide solution, with a critical amount of liquid water after removing the major amount of methanol by distillation at 150°F. - the boiling point of methanol - and not above the point of gel formation, usually about 210° – 225°F. The amount of water is approximately 1 mol of water per mol of oxide used, generally in the range of 0.6 to 1.5 mols water, depending on how nearly anhydrous are the ingredients used in the carbonation reaction. In the case of magnesium sulfonate made with metal dissolved in methanol, the amount of water may be as much as 2 – 3 mols per atom of magnesium in the methylate.

After adding the water, for example at 180°F, and thoroughly mixing to obtain uniform distribution thereof, the mixture can be heated without gelling on the heating surface. All the remaining methanol can be then evaporated by heating to 250° – 300°F., usually 270° – 290°, in the presence of hydrocarbon solvent such as xylene or V.M.&P. naphtha boiling at about this temperature and serving to strip out methanol by azeotropic action. It is usually advantageous to effect this methanol stripping after the initial water treat by flash evaporation, transferring the mixture gradually into boiling solvent and holding the temperature at about 260° to 290°F. The resulting mixture is then cooled to about 200°F. and further treated with water in liquid phase in sufficient excess to insure complete hydration of the carbonate and elimination of methanol from the complex. Then the product is heated to about 280°F. to dehydrate it, evaporating excess water by azeotropic action of solvent vapor. The oil is then filtered rapidly using a small amount, e.g. 1%, of filter aid such as diatomaceous earth - "Hyflo" or "Dicalite." After stripping to remove remaining solvent, the finished oil will be brilliantly clear and of low viscosity, with alkali values of 350 to 450.

EXAMPLE 1

To 50 gm. neutral magnesium sulfonate, QAS = 1.55%, calcium basis, containing about 40% sulfonate in lubricating oil, was added 350 cc. carbonated magnesium methylate solution made by dissolving magnesium metal in anhydrous methanol and xylene and saturating with $CO_2$. It titrated 91 alkali value. The mixture was heated to 180°F, thereby distilling off most of the methanol which could be recycled to the metal dissolver as described in my application Ser. No. 154,856. No gelling took place at this temperature. To the clear solution was then added 100 cc. more xylene and, with rapid stirring, 10 cc. water equal to 1 mol per equivalent of magnesium in the methylate employed (2 mols per atom of magnesium). The solution became a semi-solid mush which reverted to a semi-fluid gel within a few minutes. This gel was added gradually to 500 cc. boiling xylene and heated to 270°F, to expel methanol. After cooling to 240°F., 50 cc. water was added and mixed thoroughly for 5 minutes, then dehydrated at 260°F. The solution filtered rapidly through a suction funnel using a small amount of diatomaceous earth filter aid. The clear filtrate was stripped free of solvent at 400°F., while blowing with $CO_2$. The clear oil tested 400 alkali value with a yield of 70 grams - 140% of charge.

EXAMPLE 2

The above test was repeated except that the amount of water used in the first stage was increased by 50% - i.e. 3 mols per atom of magnesium in the methylate. The filtration was slow although the product was satisfactory with alkali value of 395.

EXAMPLE 3

To 100 gm. neutral magnesium sulfonate was added 700 cc. methanol solution of carbonated magnesium methylate - 91 A.V. containing about 200 cc. xylene. The mixture was heated to 150°F. and 200 cc. more xylene was added. Heating was continued to 180°F. when 20 cc. $H_2O$ was added gradually with turbine mixing. The solution became a solid mush within 20 seconds, then changed to a fluid, transparent gel within 1 minute. After stirring two more minutes, the gel was transferred to 500 cc. boiling xylene and heated from 200° to 270° in 10 minutes, driving off methanol with the xylene vapors. On cooling to 230°, 100 cc. water was added to complete the hydrolysis and dissolve the gel, the temperature falling to 190°F. After 5 minutes mixing at this temperature, it was dehydrated at 270° and filtered easily with Hyflo filter aid. The clear filtrate was stripped free of solvent at 430°F. Yield - 137 gm. Alkali Value - 435.

EXAMPLE 4

To 100 grams neutral calcium sulfonate - 1.55% QAS(Ca) - in a turbo mixer was added 200 cc. xylene and 200 cc. anhydrous methanol. 35 grams calcium oxide (0.62 mol) was partially carbonated in 100 cc. methanol by injecting $CO_2$ until warm, then added to the mixer and $CO_2$ injected for 5 minutes at 80° - 105°F, then 30 minutes at 105° - 113°F, then 20 minutes at 113° - 116°F. After 75 minutes total carbonation time, the reaction was terminated at 109°F. The contents of the mixer were transferred to a pan with additional xylene and heated to 180°F. To the mixture was added with rapid agitation, 11 cc. water (0.62 mols). The soupy mixture instantly became very fluid. It was heated to 270°F, diluted with 100 cc. more xylene and cooled to 180° when it was again treated by addition of 40 cc. water and dehydrated by heating to 280°F. Filtration was satisfactory with Hyflo and Standard Cel. The clear filtrate was stripped at 440°F. Yield - 108 gm. Alkali Value - 55 (phenolphthalein indicator) and 385 - (methyl orange indicator). The oil was quite fluid.

EXAMPLE 5

To 56 gm. CaO (1 mol) in a turbo mixer was added 200 cc. methanol and xylene. $CO_2$ was passed in until the temperature reached 130°F. To the reaction was added 153 gm. calcium sulfonate (QAS(Ca) = 1.55%) in 150 cc. xylene. Carbonation was continued until the temperature reached 151°F. in 15 minutes. Then the mixture was heated on a hotplate to 180°F. without gelling.

To the mix was then added with rapid agitation 15 cc. water (0.83 mol) and the mixture was heated to 270°F. to drive off methanol. The nearly clear solution settled out some sediment on cooling to 180° - mostly impurity from the lime. A second water treatment was then given with 40 cc. $H_2O$ followed by dehydration to 275°F. The solution filtered very rapidly, 400 cc. passing through the filter in about one minute. The clear, red filtrate was then stripped free of solvent by heating to 420°F. Alkali Value - Value 9 (phenolphthalein) and 325 (methyl orange).

EXAMPLE 6

To 50 gm. neutral magnesium sulfonate was added 350 cc. carbonated magnesium methylate solution (91 A.V.) followed by evaporation of methanol to 160°F. 100 cc. xylene was added with 50 cc. sec. butyl alcohol. Heating was continued to 210°F. when gelling began. To the mixture was added 10.3 cc. $H_2O$ (1 mol per equivalent of basic magnesium) producing a mush. Three more mols of water were added causing the mush to disperse to a cloudy liquid which was dehydrated to a temperature of 270°F. Attempts to filter the solution were a complete failure, not one drop passing through the suction filter bed in 30 minutes. This experiment shows the importance of controlling the amount of water in the first water treating stage and the need for avoiding gel formation when removing methanol from the overbasing reaction mixture.

EXAMPLE 7

Oil soluble sulfonic acid was prepared by treating with oleum (25% $SO_3$), a mixture of 750 cc. (660 gm) neutral oil 600 (SSU at 100°F.) and 250 cc. (219 gm.) heavy benzene alkylate derived from alkylating benzene with monochlor paraffins of straight chain structure separated from petroleum naphtha with molecular sieves.

To one liter (879 gm) of this mixture was gradually added 310 cc. oleum at 62° - 108°F. After the reaction was complete (1 hour), the mixture was diluted with 2 liters of V.M.&P. naphtha and settled overnite. The sludge was discarded and the upper solvent - oil layer - 2800 cc. - was stripped of sulfur dioxide by blowing. The "acid oil" tested 16.5 acid value (mg. KOH per gm.).

To 1350 cc. of this acid oil (0.4 gm. equivalent) was added a solution of 33.3 gm. magnesium metal (1.4 atoms) dissolved in 900 cc. anhydrous methanol and 200 cc. V.M.&P. naphtha, which had been carbonated completely with $CO_2$. The temperature rose from 60° to 70°F. from the heat of neutralization. Anhydrous methanol was distilled off to a temperature of 210°F. without gel formation, the distillate comprising 750 cc. methanol and 50 cc. naphtha.

To the mixture at 210°F was then added with rapid agitation, 50 cc. water (2.8 mols) equal to 2 mols per atom of magnesium metal employed. Methanol and naphtha distilled over during this first stage water treat at 150° and on heating to 180°F., 120 cc. methanol and 70 cc. naphtha being collected from the condenser.

The product from this reaction was then treated with a large excess of water - 500 cc. - and settled overnight. Solvent naphtha was distilled from the oil layer giving an oil which was of quite low viscosity testing 270 alkali value, QAS - 0.81% mg. and 0.19% sulfate expressed as $Na_2SO_4$. No filtration was required except a final "polish" filtration to brighten the product.

EXAMPLE 8

In a 55 gallon reaction vessel was placed 7 gallons of anhydrous methanol and 4.75 lbs. of magnesium metal in the form of rods. The metal dissolved over a period of 3 days at about 110°F., hydrogen being evolved. To the solution during the reaction was added 15 gallons of xylene solvent. $CO_2$ was injected into the turbid gray solution for 2 hours, producing a clear solution of carbonated methylate herein referred to as "Complex".

To this complex was added 50 lbs. of magnesium sulfonate oil, derived from sulfonated alkyl benzene and magnesium oxide, and 6.5 gallons xylene solvent. Methanol was distilled from the mixture at 210°F. without gel formation. Then 3.2 liters of water (2 mols per atom of magnesium metal) was added gradually with rapid mixing, at 188°F. The mixture, now gelatinous, was pumped into a still and heated to 285°F., removing 19 gallons of solvent and methanol. The mixture was then pumped to a mixer where it was given a second water treat at 190°F adding 3.2 liters more water. After this treat, it was returned to the still and dehydrated at 285°F. The mixture filtered rapidly with Hyflo filter aid and the solution stripped of solvent at 400°F. The clear oil tested as follows:

| | |
|---|---|
| Alkali Value | 340 |
| QAS | 1.22% (Ca equiv.) |
| QAS | 0.74% magnesium |

EXAMPLE 9

To 100 gm. magnesium sulfonate in oil - about 40% - was added 400 cc. xylene and 600 cc. of Mg—$CO_2$—MeOH complex. The clear solution was heated to 235°F., taking off 655 cc. of methanol and xylene. At 235° the solution became a solid gel which could no longer be mixed. This gel was dispersed in 400 cc. xylene and treated with 2 mols water per atom of magnesium in the complex after which the gel became fluid and could be heated to 285°F. to eliminate all uncombined methanol.

On cooling to 190°F., it was given a second treat with 20 cc. water and stripped free of solvent at 450°F. It was redissolved in xylene and filtered satisfactorily with Hyflo aid and the filtrate stripped again to 400°F. The product was quite viscous and hazy. The alkali value was 400.

This example shows the bad effect of stripping before the initial water treat to a point where gel formation occurs.

The benzene alkylate employed in sulfonations for the work herein above reported was characterized by the following tests:

| | |
|---|---|
| Gravity — API | 29.6%° |
| Aniline Point | 153°F. |
| Viscosity — 100°F. | 30.64 centistokes |
| Viscosity Index | 92 |
| Distillation; A.S.T.M. | |
| 5% | 694°F. |
| 10% | 702°F. |
| 20% | 710°F. |
| 30% | 716°F. |
| 40% | 720°F. |
| 50% | 724°F. |
| 60% | 730°F. |
| 70% | 734°F. |
| 80% | 740°F. |
| 90% | 752°F. |
| 95% | 760°F. |

Sulfonation was performed by treating a blend of the alkylate - usually 40 – 60% with a petroleum lubricating distillate of 150 to 600 sec. (100°F) Saybolt viscosity, with oleum of 25% $SO_3$ content, followed by diluting with naphtha and settling sludge, then washing the oil layer to remove sulfuric acid, then neutralizing with the desired base metal, calcium hydroxide, magnesium hydroxide, barium hydroxide, etc. after which the neutral product oil is thoroughly dehydrated. Examples of this preparation are found in U.S. Pat. Nos. 3,591,498 and 3,591,627.

Analytical methods for sulfonate content by titration with quaternary ammonium sulfonate (QAS) are given in a paper by House et al, Analytical Chemistry, Vol. 26, Sept. 1954, pages 1492–97, and also in Technical Bulletin of Rohm & Haas Company, February, 1960, "Assay of Hyamine Products." The result is expressed in equivalent percent calcium.

The Alkali Value can be determined by A.S.T.M. Method D664–58, expressed in milligrams KOH per gram of sample.

Further referring to the water used in the initial critical water treat, the amount of water should be 0.6 to 1.5 mols per atom of overbasing metal present where the overbasing is effected by the use of metal oxide, and double this amount where the overbasing is effected by use of metal. The rule to follow is that the amount of water to add should equal 1.2 to 3 mols per atom of overbasing metal less 1 mol per each atom of oxygen attached to the metal and less the amount of water which may be inadvertently present in the "anhydrous" reaction ingredients, methanol, hydrocarbon solvent and sulfonate. Expressed as an equation:

Water required (mols) = 0.6 to 1.5 (mols of overbasing oxide) + 1.2 to 3 (atoms of overbasing metal) - mols of water present in the ingredients.

This formula will apply equally to the use of calcium or barium metals when used to prepare the methylate. Mixtures of metals are also contemplated wherein a calcium is overbased with magnesium or barium or where a calcium or barium sulfonate is overbased with both magnesium and calcium methylates.

The amount of water used in the second water treat is at least equal to the amount in the initial treat and usually two to five times this amount to provide an excess to insure complete hydration of methanol complex present.

The hydrocarbon solvent can be paraffinic or aromatic, the latter being preferred because of miscibility with methanol. Toluene and xylene are good examples of the latter. Varnish Makers & Painters naphtha (V.M.&P.) boils in the range of xylene and is convenient with respect to its azeotroping effect on recovery of methanol and its easy recovery by distillation.

Having thus described my invention, what I claim is:
1. The method of making highly overbased oil soluble sulfonates of metals of Group 2 of the Periodic System characterized by low viscosity and high clarity, with alkali values upwards of 250 which comprises the following steps:
   1. Preparing a complex of said Group 2 metal, methanol and $CO_2$ by reacting said metal or oxide thereof with anhydrous methanol and $CO_2$-mixing sufficient complex with oil soluble sulfonate and hydrocarbon lubricating oil to provide a base number in excess of 250 in the final product, in the presence of a volatile hydrocarbon solvent to reduce viscosity;

2. Heating the resulting mixture above the boiling point of methanol but below the point of incipient gel formation, thereby distilling off the major amount of anhydrous methanol present in anhydrous form suitable for recycling in the process;

3. Initially treating the resulting mixture at 180°–210°F. with a critically limited amount of liquid water determined by the formula: Mols of water = 0.6 to 1.5 (mols of overbasing oxide) + 1.2 to 3 (atoms of overbasing metal) - mols of water present in the methanol and sulfonate;

4. Stripping methanol from the initially water treated sulfonate mixture at a temperature of about 250° to 300°F;

5. Again treating the mixture with an excess of liquid water at least equal to the amount used in the initial water treat;

6. Dehydrating the mixture at a higher temperature and filtering the product to remove unreacted metal oxide, carbonate, and contaminating solids.

2. The method of claim 1 wherein the temperature of distilling in Step 2 is in the range of 180° to 210°F.

3. The method of claim 1 wherein the colloidal complex is prepared from CaO, methanol and $CO_2$ and the amount of water used in the initial water treating stage is about 1 mol per mol of calcium oxide used.

4. The method of claim 1 wherein the colloidal complex is a methanol solution of metallic magnesium saturated with $CO_2$ and the amount of water used in the initial water treating stage, Step 3, is about 2 mols per atom of metal employed.

5. The method of claim 1 wherein stripping methanol from sulfonate in Step 4 is effected by flashing from a boiling mass of said volatile hydrocarbon solvent into which the sulfonate mixture is gradually introduced.

* * * * *